J. ADAMS.
Soil-Pulverizer.

No. 196,617.  Patented Oct. 30, 1877.

Witnesses:
Henry R. Leonard
John S. Smear

Inventor:
his
Jessex Adams
mark

UNITED STATES PATENT OFFICE.

JESSE ADAMS, OF LEWISVILLE, ASSIGNOR OF ONE-HALF HIS RIGHT TO JOHN S. SMEAR, OF WAVELAND, INDIANA.

IMPROVEMENT IN SOIL-PULVERIZERS.

Specification forming part of Letters Patent No. 196,617, dated October 30, 1877; application filed March 21, 1876.

*To all whom it may concern:*

Be it known that I, JESSE ADAMS, of the town of Lewisville, county of Henry, and State of Indiana, have invented certain new and useful Improvements in Soil-Pulverizers and Stalk and Litter Cutters, of which the following is a specification:

Reference is hereby had to the accompanying drawings, which are made a part hereof, and on which similar letters of reference on the different figures indicate similar parts.

Figure 1:
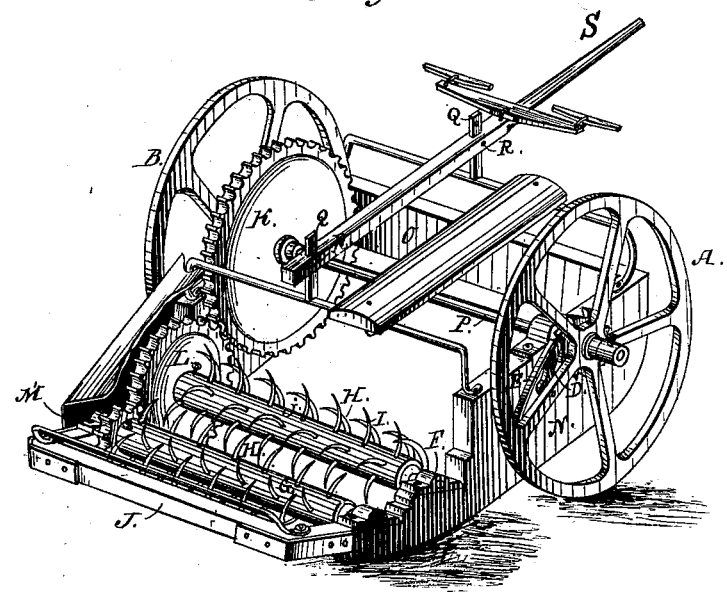
Figure 2:
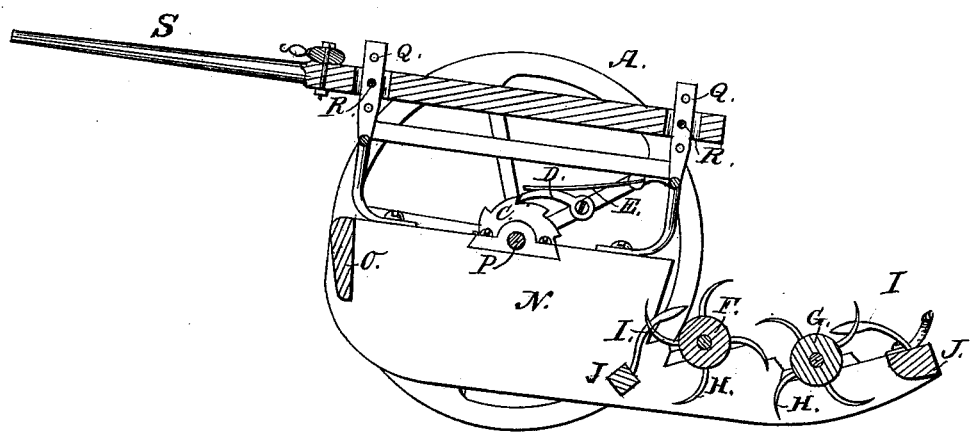

Figure 1 is a perspective view of my invention. Fig. 2 is a longitudinal sectional view thereof.

The object of my invention is to provide an efficient means of pulverizing the soil, and of cutting up, to a degree of fineness that will not interfere with the free cultivation of the field, all corn-stalks, stubble, or other litter that may encumber the ground. This is accomplished by a machine constructed for that purpose.

In the drawings, A and B represent the wheels on which my machine runs. N is the frame, which is pivoted on the axle P. C is a ratchet-wheel keyed fast to the shaft or axle P. D is a pawl which engages in said wheel C, and which is held in place by the spring E. F and G are cylinders from which project the teeth H H. I I are sickle-shaped knives, which project from the bars J J. K is a gear-wheel on axle P. L is a gear-wheel on cylinder F. M is a gear-wheel on cylinder G. Q Q are standards, to which is attached the pole for the team. R R are pins in said standards, by which the pole is raised or lowered and the distance to which the teeth H H shall enter into the ground regulated.

The operation of my invention is as follows: The machine is drawn ahead by the tongue or pole S. The traction, of course, revolves the wheel A, which, by means of the catch D and ratchet-wheel C, revolves the shaft P, which carries the gear-wheel K. This, in turn, drives gear-wheel L, which drives gear-wheel M, making the cylinders F and G revolve toward each other, and the teeth H H are thereby driven into the ground. Said teeth not only pulverize the soil by their action, but catch up stubble, vines, corn-stalks, or any other description of litter, and force it against the knives I I, and cut it to a degree of fineness so that it will not interfere with further cultivation, and mix it with the earth, so that it will rot and become of use as a fertilizer.

If desired, the catch D can be disconnected and the cylinders F G made fast, when the machine will act simply as a harrow.

Having thus fully described my invention, what I claim as new, and desire to secure by Letters Patent, is—

In a machine for pulverizing the soil, the combination of the frame N, pivoted on the axle, the adjustable draft-pole S, and standards Q Q with cylinders F and G, having teeth H H, and bars J J, having knives I I, substantially as herein shown and described.

JESSE ×̇ ADAMS.
(his mark.)

Witnesses:
HENRY R. LENNARD,
JOHN S. SMEAR.